(12) United States Patent
Valmikam et al.

(10) Patent No.: US 8,457,084 B2
(45) Date of Patent: Jun. 4, 2013

(54) COMMUNICATION GROUP CONFIGURATION IN A NETWORK

(75) Inventors: Ravi Valmikam, Westford, MA (US); Prince Samar, Waltham, MA (US); Woojune Kim, Arlington, MA (US); Fabio M. Chiussi, Long Branch, NJ (US)

(73) Assignee: Airvana LLC, Chelmsford, MA (US)

( * ) Notice: Subject to any disclaimer, the term of this patent is extended or adjusted under 35 U.S.C. 154(b) by 1587 days.

(21) Appl. No.: 11/642,245

(22) Filed: Dec. 20, 2006

(65) Prior Publication Data

US 2008/0151843 A1    Jun. 26, 2008

(51) Int. Cl.
*H04W 4/00* (2009.01)

(52) U.S. Cl.
USPC ........ 370/338; 455/426.1; 455/446; 455/436; 455/440

(58) Field of Classification Search
USPC .................. 455/404.2, 426.1, 446, 449, 560, 455/561; 370/338
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,263,076 B1 * | 8/2007 | Leibovitz et al. | 370/310 |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 7,627,326 B1 * | 12/2009 | Miller, II | 455/454 |
| 2002/0196749 A1 | 12/2002 | Eyuboglu et al. | |
| 2003/0100311 A1 | 5/2003 | Chung et al. | |
| 2004/0213190 A1 | 10/2004 | Kyperountas et al. | |
| 2005/0003827 A1 * | 1/2005 | Whelan | 455/454 |
| 2005/0148368 A1 * | 7/2005 | Scheinert et al. | 455/561 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |

(Continued)

FOREIGN PATENT DOCUMENTS

CN     101611642 A    12/2009
GB       2452688       3/2009

(Continued)

OTHER PUBLICATIONS

International Preliminary Report on Patentability for PCT application No. PCT/US2007/087865 mailed Jul. 2, 2009 (8 pages).

(Continued)

*Primary Examiner* — Kathy Wang-Hurst
(74) *Attorney, Agent, or Firm* — Fish & Richardson P.C.

(57) ABSTRACT

Techniques for communication group configuration in a network are described. Location information describing a location of a first access point and neighborhood information related to the location of the first access point and to locations of neighboring access points are used to assign the first access point to a group of access points, where the group of access points includes one or more of the neighboring access points.

49 Claims, 7 Drawing Sheets

U.S. PATENT DOCUMENTS

| | | |
|---|---|---|
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0099598 A1* | 5/2007 | Voyer et al. ............ 455/411 |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0200188 A1* | 8/2008 | Rajahalme et al. ........... 455/458 |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0296676 A1* | 12/2009 | O'Neil et al. ............. 370/338 |

FOREIGN PATENT DOCUMENTS

| | | |
|---|---|---|
| GB | 2457413 | 8/2009 |
| JP | 2004-274174 | 9/2004 |
| JP | 2004/274174 | 9/2004 |
| JP | 2010-515296 | 5/2010 |
| WO | WO 2004/027445 | 1/2004 |
| WO | WO 2005/088991 | 9/2005 |
| WO | WO2008/079804 | 7/2008 |

OTHER PUBLICATIONS

International Search Report and Written Opinion from corresponding PCT application No. PCT/US2007/087865 mailed on Apr. 17, 2008 (49 pages).

Office action with English translation from corresponding Chinese Application No. 200780051497.8, issued Dec. 3, 2012 (13 pages).

Examination Report from corresponding United Kingdom Application No. 0910839.0 dated Oct. 22, 2010, 2 pages.

Response to office action issued Feb. 14, 2012 in corresponding Chinese Application No. 200780051497.8, filed on Jun. 29, 2012 (12 pages).

Office action with English translation from corresponding Chinese Application No. 200780051497.8, issued Feb. 14, 2012 (56 pages).

Response to Examination Report from corresponding United Kingdom application No. 0910839.0 dated Oct. 22, 2010, filed Feb. 21, 2011 (13 pages).

Office action with English translation from corresponding Japanese Application No. 2009-543127, issued Sep. 25, 2012 (51 pages).

Office action from corresponding Chinese application No. 200780051497.8 issued Apr. 16, 2013 (10 pages).

Response to Office action with English translation from corresponding Japanese Application No. 2009-543127, issued Sep. 25, 2012, filed Mar. 25, 2013 (25 pages).

* cited by examiner

COMMUNICATION GROUP CONFIGURATION IN A NETWORK

TECHNICAL FIELD

This description relates to communication group configuration in a network.

BACKGROUND

Cellular wireless communications systems, for example, are designed to serve many access terminals distributed over a large geographic area by dividing the area into regions called "cells". At or near the center of each cell, an access point, also sometimes referred to as a base transceiver station, is located to serve access terminals (e.g., cellular telephones, laptops, PDAs) located in the cell. Access points are typically assigned to communication groups which include "paging groups" and "neighbor groups." The neighbor group of an access point includes neighboring access points with which the access terminal performs handoffs (i.e., receiving or transferring a call in progress). For example, when the number of connections supported by an access point approaches a maximum load that can be supported by the access point, that access point may transfer one or more of the connections to one or more access terminals belonging to its neighbor group. The paging group of an access point includes neighboring access points whose coverage area an AT can roam into after closing connection to the first access point. A communication group of an access point includes one or more access points that are configured to perform one or more specific communication functions in coordination with the access point.

SUMMARY

In general, in one aspect, the invention features methods and computer programs for grouping access points in a network. The method includes storing location information describing a location of a first access point, the location information generated at the first access point; receiving neighborhood information related to the location of the first access point and to locations of neighboring access points; and based on the neighborhood information, assigning the first access point to a group of access points. The group of access points includes one or more of the neighboring access points.

In general, in another aspect, the invention features methods and computer programs for automatically assigning a first access point to a group of neighboring access points based on information generated at the first access point about the location of the first access point and based on stored geographical information that includes relative locations of the first access point and of neighboring access points that belong to the group.

In general, in a further aspect, the invention features a san access point configured to assign itself to a group of access points. The access point includes a location detection mechanism configured to detect a location of the access point and generate location information describing the location; a communication module configured to receive from a server, neighborhood information related to the location of the first access point and to locations of neighboring access points; and one or more processors configured to determine a group of access points based on the neighborhood information and to recognize the group of access points as a group to which the access point belongs. The group of access points includes one or more of the neighboring access points.

In general, in yet a further aspect, the invention features a system configured to assign a first access point to a group of access points. The system includes memory configured to store location information describing a location of a first access point, the location information received from the first access point; a communication module configured to receive neighborhood information related to the location of the first access point and to locations of neighboring access points; and a processor configured to assign the first access point to a group of access points based on the neighborhood information. The group of access points includes one or more of the neighboring access points.

Implementations may include one or more of the following. The receiving and assigning may be performed by the first access point or by a remote server. If performed by a remote server, assignment information for configuring the first access point to recognize the group of access points as a group to which the first access point belongs may be sent from the remote server to the first access point. The location information may describe a physical location and include, for example, a longitude and a latitude determined for the first access point. The location information may also describe a virtual address determined for the first access point. The neighborhood information may include a distance between the first access point and one or more of the neighboring access points. The neighborhood information may describe a topology of an area (e.g., obstructions between the first access point and one or more of the neighboring access points) that includes the first access point and one or more of the neighboring access points.

In response to receiving notification of a change in the neighborhood information, the first access point may be reconfigured. For example, the first access point may be assigned to a different group. A change in geography of an area including the location of the first access point and a location of the one or more neighboring access points belonging to the group may be detected. A change in channel conditions between the first access point and one or more neighboring access points belonging to the group may be detected.

The group assigned to the first access point may include neighboring access points that are each capable of receiving a call transferred from the first access point during a handoff. The group may include neighboring access points that are each capable of establishing a new connection with an access terminal if a connection between the access terminal and the first access point is breached. The neighborhood information may be received from a map server application, e.g., in real-time as changes associated with the location of the first access point or the locations of neighboring access points are detected. The changes may include one or more of: a topology, a geography, and a communication channel condition.

A global neighborhood map of neighboring access points located in an area including the first access point may be generated, for example, at the first access point or at the remote server. The map may include a second access point belonging to the neighboring access points that support an airlink technology that is different than an airlink technology supported by the first access point; and the global neighborhood map may be used to coordinate a handoff between the first and second access points using the global neighborhood map. In response to determining that the second access point has a better signal quality than the first access point; an access terminal may be directed to close a connection with the first access point.

The location detection mechanism of an access point may include a global-positioning satellite (GPS) device and/or a secure mechanism for receiving location information entered by a technician. For example, the location information may include one or more of: a latitude, a longitude, and a street address. The server may include a commercially available server operated by a party that is not affiliated with a party operating the access point. For example, the server may be a map server that produces a map of spatially referenced data from geographic information, and the neighborhood information may be derived from the data.

The communication module of the system may be further configured to send assignment information from the remote server to the first access point, where the assignment information configures the first access point to recognize the group of access points as a group to which the first access point belongs. The processor may be further configured to assign the first access point to a different group in response to receiving notification of a change in the neighborhood information. For example, the change may include a change in geography or a change in channel conditions between the first access point and one or more neighboring access points belonging to the group. The system may also include a map server configured to generate the neighborhood information, where the neighborhood information is derived from a map of spatially referenced data corresponding to access points in a geographic area.

Advantages may include one or more of the following. Access points can be automatically deployed and configured into communication groups. The communication group of an access point may be updated in response to detecting topological and/or geographical changes to the areas in which the access point or any of its group members are located. The updating may be performed adaptively as the changes occur in real-time.

Paging groups and neighbor groups that provide optimal network paging and network handoffs can be determined from neighborhood information supplied by a map server or map server application. Examples of map server applications include Google® maps, Microsoft® virtual earth applications, and other commercially available applications. Automating communication group configuration improves the scalability of network architectures, including flat or distributed architectures and centralized architectures. Access points can be configured automatically without intervention from a human operator or technician. The access-point configuration system can be implemented in a centralized fashion, semi-distributed fashion, or fully distributed fashion. As soon as an access point enters network, it may determine its communication groups immediately or at a later time. Changes to communication group assignments may be propagated to access points from a server at precise times.

The details of one or more embodiments are set forth in the accompanying drawings and the description below. Other features, objects, and advantages will be apparent from the description and drawings, and from the claims.

DETAILED DESCRIPTION

Methods for organizing access points into neighbor groups and paging groups (referred to as "access point configuration") typically require a human operator or technician to manually configure each of the access points of a radio access network. In some instances, an operator uses a GUI based tool to visualize neighboring access points on a map and analyzes the map to determine which access points should be configured in various communication groups, which include paging groups and neighbor groups. If some of the features (e.g., land topology) shown in the map are inaccurate or unclear, or if various features of the land are not shown in the map, a technician may need to survey the land and report back to the operator before communication groups can be determined. The manual configuration of access points into communication groups often requires substantial operator overhead as some radio access networks may include hundreds of thousands of access points. Furthermore, delays in configuring access points (e.g., due to a lack of up to date geographical information, lack of operators or lack of easy access to the access points) can cause suboptimal network performance. Here we describe a system for automating access-point configuration as the topology of a radio access network undergoes changes and as more access points are added to the network.

Figure 1A:
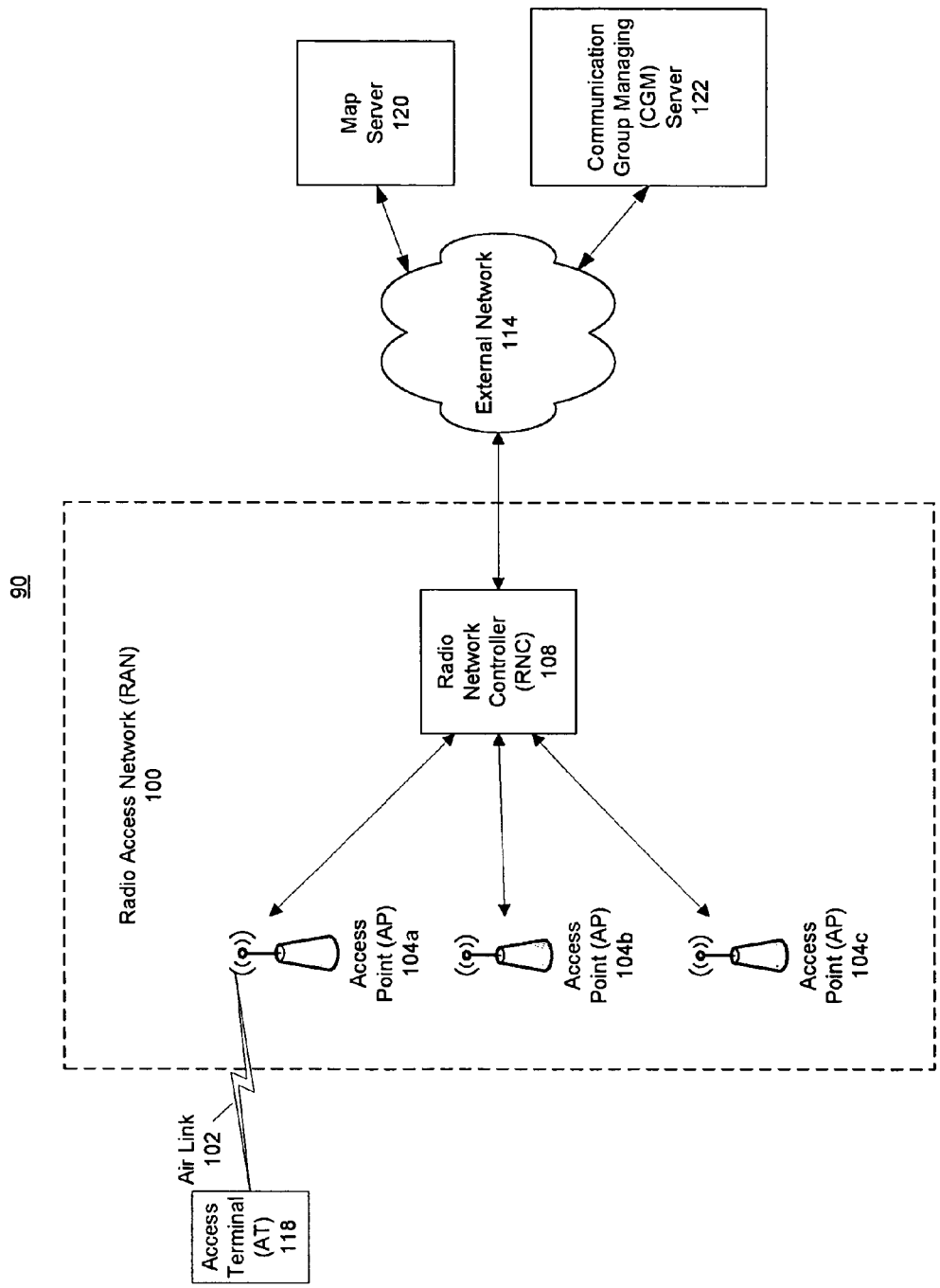
FIG. 1A is a block diagram of a system for determining a neighbor group for an access terminal.

Referring to FIG. 1A, a wireless network communication system 90 includes a map server 120 running a map server based application (such as a specialized Google® Mashup application or a Microsoft® Virtual Earth application), a communication group managing (CGM) server 122, a radio access network (RAN) 100, one or more access terminals (AT) 118, and an external network 114 (e.g., the Internet) over which the map server 120 and the CGM server 122 communicate with the RAN 100. The RAN 100 includes multiple access points 104a-c (collectively referred to as access points 104) that are each configured to communicate with the AT 118 over an airlink 102 (e.g., AT 118 is shown communicating with access point 104a).

The RAN 100 may optionally include a radio network controller (RNC) 108. For example, the RAN 100 shown in the wireless network communication system 91 of FIG. 1B includes an access gateway 109 instead of an RNC 108. When included in the RAN 100, the RNC 108 communicates with the access points 104 and controls their transmitters and receivers, initiates and maintains client sessions, directs data packets received from the external network 114, and performs other radio access and link maintenance functions such as soft handoff and sector selection.

The access points 104 are capable of assigning themselves to communication groups without manual intervention by a human operator. An access point (e.g., access point 104a) sends its geographic location to the map server 120. In response, the map server 120 sends the access point 104a information that includes access points located in the vicinity of the access point 104a (referred to as "neighboring access points") and other information related to the physical area encompassing the access point 104a and the neighboring access points (e.g., the locations of the neighboring access points). This information provided to the access point 104a from the map server 120 is referred to as "neighborhood information." From the neighborhood information, the access point 104a determines communication groups (e.g., neighbor, paging groups, and other peer groups) of neighboring access points that best meet various criteria and assigns itself to those communications groups. In this manner, the access point 104a can be configured and re-configured automatically, without the need for human intervention.

In some embodiments, the CGM server 122 assigns communication groups to the access terminals 104a-c. In these embodiments, each access point, as it learns its own location, registers itself with CGM server 122, and the CGM server communicates with the map server 120 or a specialized application provided by the map server 120, such as a Google® Mashup application, to determine the communication groups of the access points 104a-c based on neighborhood information provided by the map server 120. The CGM server may be implemented as a central server or group of central servers or as semi-distributed servers operating over different areas.

The RAN 100 is configured to support various mobile wireless access technologies, an example of which is 1×EV-DO (1×EV-DO). The RAN 100 may include other networks and network components (not shown in FIG. 1) in addition to the access points 104 and the RNC 108. For example, the RAN 100 may include networks of devices that use the TCP/IP network protocols to exchange data (e.g., IP networks and IP backhaul networks), packet data serving nodes, and other network components. The RAN 100 uses communication protocols to transmit data (e.g., voice over IP packets) between the AT 118 and the external network 114. Examples of communication protocols used by the RAN 100 include, the evolution data-only (1×EV-DO) protocol and other CDMA 2000 protocols, WIMAX™, LTE, and other airlink technologies.

The external network 114 is a network of devices that use the TCP/IP network protocols to exchange data and can be implemented in a variety of ways. For example, the external network 114 may include any kind and any combination of networks such as an Internet, a local area network (LAN) or other local network, a private network, a public network, a plain old telephone system (POTS), or other similar wired or wireless networks. The external network 114 can also include additional elements such as communication links, proxy servers, firewalls or other security mechanisms, Internet Service Providers (ISPs), gatekeepers, gateways, switches, routers, hubs, client terminals, and other elements. Communications through the external network 114 can include any kind and any combination of communication links such as modem links, Ethernet links, cables, point-to-point links, infrared connections, fiber optic links, wireless links, cellular links, Bluetooth®, satellite links, and other similar links. Communications through the RAN 100, the external network 114, or both may be secured with a mechanism such as encryption, a security protocol, or other type of similar mechanism.

The AT 118 is the client-side of the wireless network and Internet protocol, and may be implemented as a mobile device such as a cellular telephone, a wireless PDA, a handheld gaming device, or a wireless laptop computer, or a stationary device such as a desktop computer, or other fixed device with which wireless communication is desired. A communication session may be established between the AT 118 and the access point 104a before data can be exchanged. In 1×-EVDO systems a session is a shared state between the RAN 100 and an AT that defines the basis for communication between the network and the user. Session information is typically stored within the RNC 108.

Figure 1B:
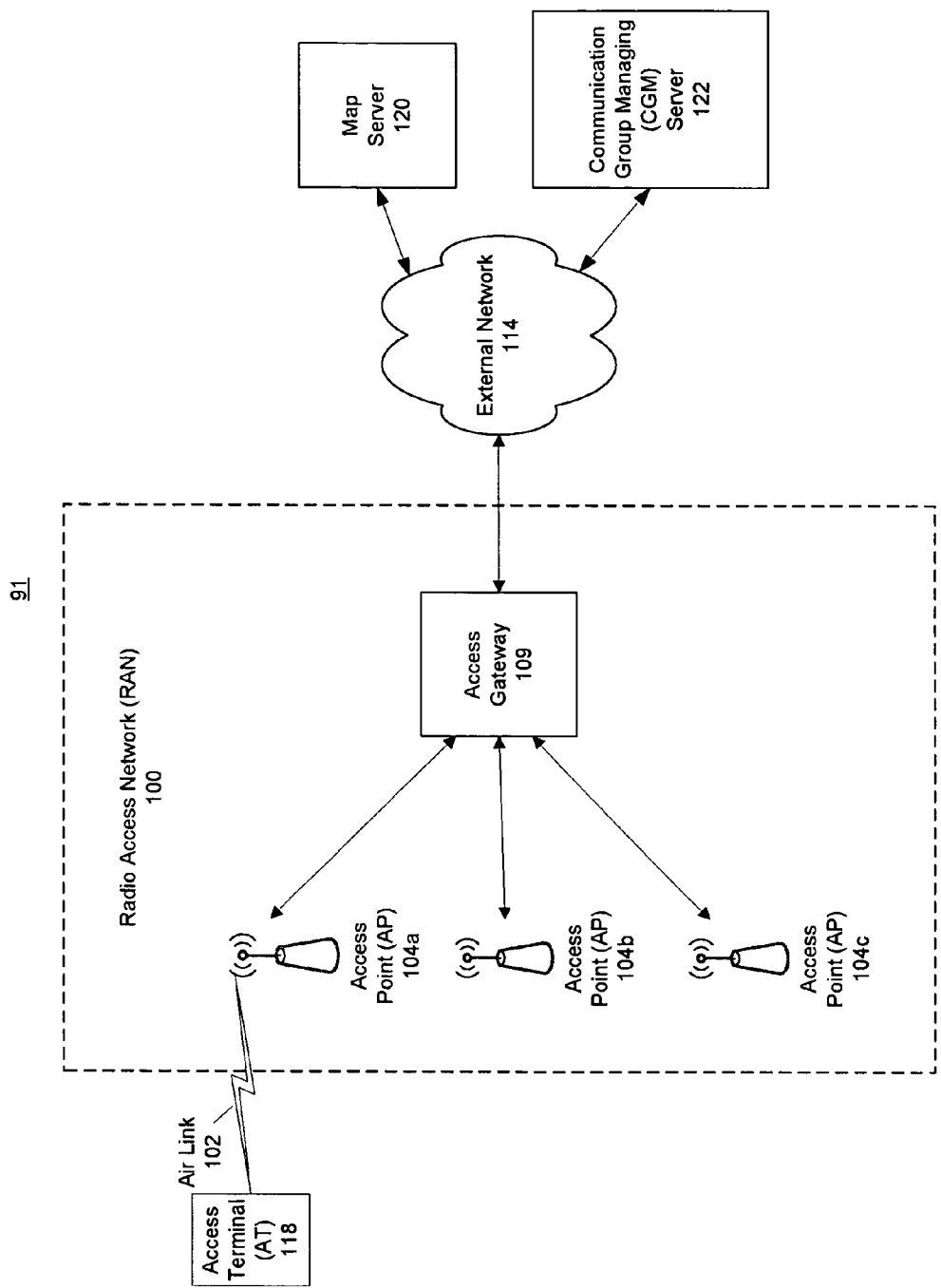
FIG. 1B is block diagram of a system for determining a neighbor group for an access terminal.

Referring to FIG. 1B, a wireless network communication system 91 includes the components of the system 90 shown in FIG. 1A, except that the RNC 108 of the RAN 100 is replaced with an access gateway 109. The access gateway 109 acts as an interface between the RAN 100 and the external network 114. The access gateways 109 may perform code and protocol conversion to facilitate communication between the RAN 100 and the external network 114. For example, in some embodiments, the system 91 represents next generation networks, which are sometimes referred to as "flat" networks, that do not include an RNC.

Figure 2:
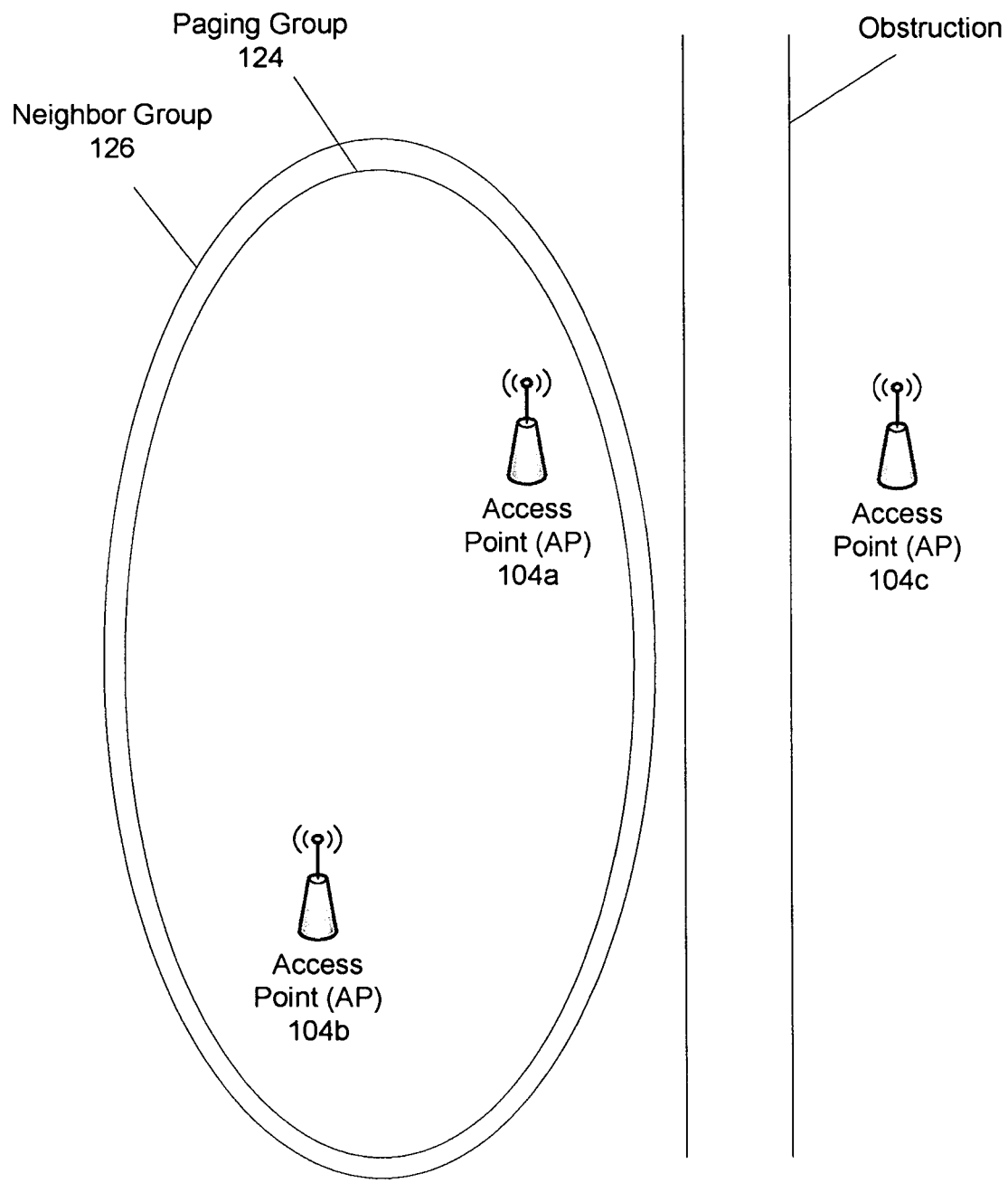
FIG. 2 is a block diagram of access points organized as a neighbor group.

Referring to FIG. 2, the access point 104a is assigned to communication groups, which include paging groups and neighbor groups. In general, a communication group of an access point (e.g., access point 104a) includes one or more access points that are configured to perform one or more specific communication functions in coordination with the access point. For example, as shown in FIG. 2, the neighbor group of the access point 104a includes access point 104b and other access points (not shown) that are capable of performing handoffs (i.e., receiving or transferring a connection in progress) with the access point 104a. Likewise, the paging group of the access point 104a includes other access point 104b and other access points (not shown) that are capable of establishing a new connection with the access terminal 18. The paging and neighbor groups of the access point 104a may include common access points (e.g., access point 104b) and/or different access points.

The access point 104a determines its paging and neighbor groups 124 and 126, based on the neighborhood information received from the map server 120. The neighborhood information includes one or more access points within the vicinity (referred to as "neighboring access points") of the access point 104a and other information related to the location of the access point 104a and to the locations of the neighboring access points. For example, the neighborhood information may include the longitude and latitude of the neighboring access points; topographical and/or line-of-sight distances between this access point and another access point; topographical obstructions between this access point and another access point (e.g., natural or man-made structures); topographical line of sight conditions between the access point 104a and neighboring access points (e.g., whether obstructing objects exist between the access points, the number of obstructions, and/or a degree of obstruction cause by the obstructing objects); connectivity (roads, foot paths etc.,) between an area covered by the access point 104a and the neighbor access points; and radio interference conditions between the access point 104a and the neighbor access points.

When selecting neighboring access points to include in a paging group 124 and a neighbor group 126, the access point 104a applies various criteria to the neighborhood information. For example, the access point 104a may select only those neighboring access points within a predetermined topological distance or those belonging to a predetermined number that are located closest to the access point 104a (e.g., the ten closest access points). The access point 104a may also apply criteria that exclude neighboring access points from consideration. For example, the access point 104a may exclude those neighboring access points located in areas where barriers or impasses exist between the neighboring access points and the access point 104a. Examples of barriers and impasses include mountains, buildings, rivers without bridges; canyons, areas without transportation paths (e.g., areas with no roads), and other structures or topological features that impede or block access to the access point 104a from a neighboring access point. Two access points may be located in close proximity to one another; however, if there is a barrier or impass between them, they may be grouped into separate paging and/or neighbor groups. For example, although the access point 104c is located in close proximity to the access point 104a, the access point 104c is not assigned to either the neighbor group 126 or the paging group 124 due to an obstruction (e.g., a river with no bridge) between the access points 104a and 104c. In the example shown in FIG. 2, the neighbor and paging groups 126 and 124 of access point 104a include access point 104b but exclude access point 104c. In general, the neighborhood determination is determined according to operator policies.

In other embodiments, the neighbor and paging groups 126 and 124 of access point 104a are determined by the CGM server 122 rather than by the access point 104a itself. In these embodiments, the CGM server 122 receives location information from the access terminal 104a and sends the location information to the map server 120. In response to receiving the location information, the map server 120 sends the CGM server 122 neighborhood information that includes neighboring access points located in the vicinity of the access point 104a and other information related to the physical area encompassing the access point 104a and the neighboring access points. Based on the neighborhood information, the CGM determines a paging group 124 and/or a neighbor group 126 for the access point 104a and sends the group assignment(s) to the access point 104a. When determining the paging and/or neighbor group assignments, the CGM server 122 applies various criteria to the neighborhood information as described above.

The access point 104a is aware that access point 104b is a member of the neighbor group 126 and the paging group 124. When a situation arises that requires coordinated operation with one or more other access points, the access point 104a selects access points from the appropriate communication group with which to seek assistance. For example, when the number of connections established between the access point 104a and access terminals (e.g., referred to as the load of the access point 104a) approaches a maximum level, the access point 104a may transfer one or more of the calls to the access point 104b and/or to other access points (not shown) belonging to its neighbor group 126, provided AT has radio connectivity to that access point. In another example, when a call between the access point 104a and the access terminal 118 is terminated or closed for any reason (e.g., purposely or unexpectedly) the access point 104a may direct access point 104b and/or other access terminals belonging to its paging group 124 to page the access terminal 118 to re-establish contact with the access terminal 118.

Figure 3:
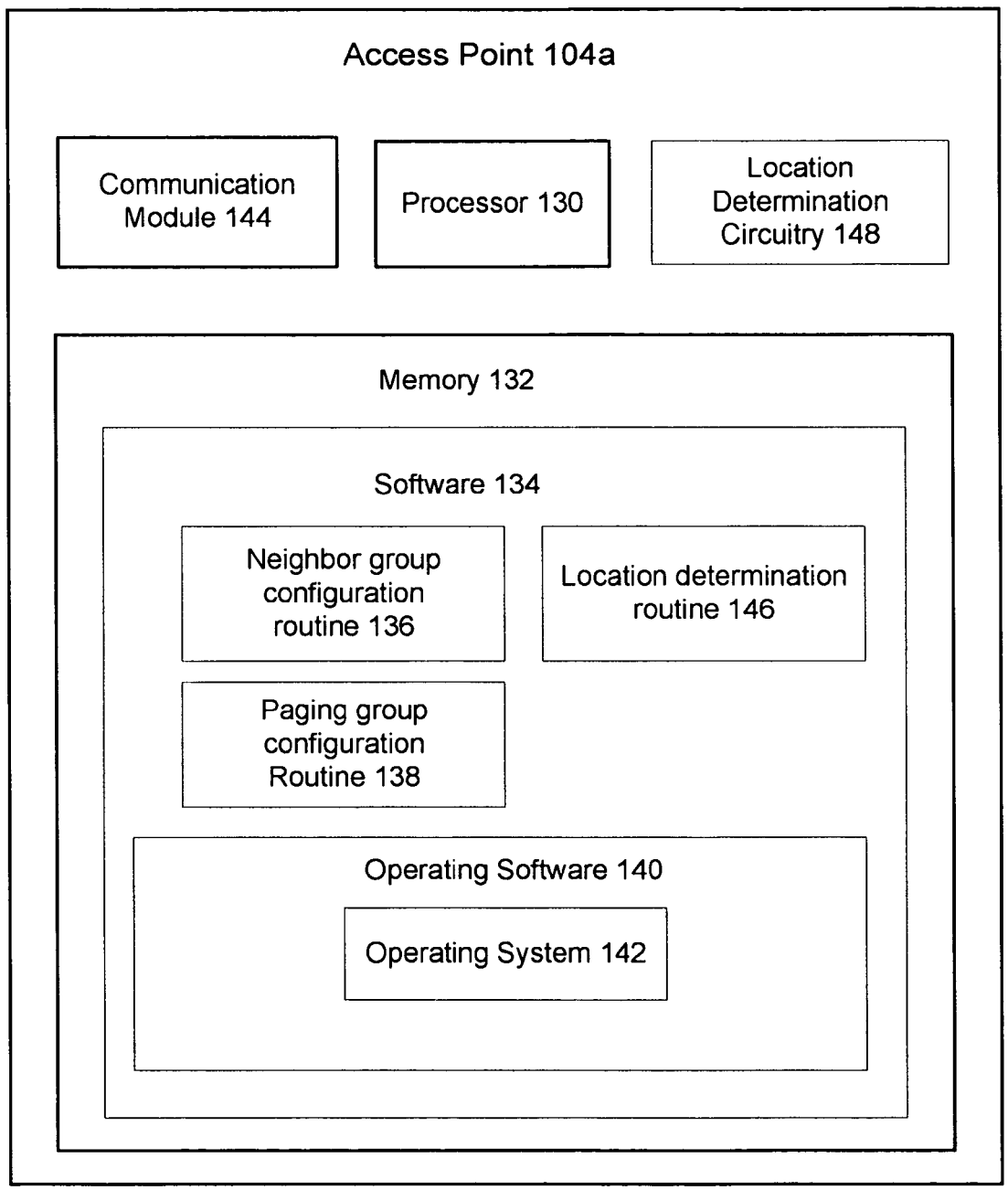
FIG. 3 is a block diagram of an access point for use with the system of FIG. 1.

Referring to FIG. 3, a block diagram of the access point 104a is shown. Access points 104b-c are similar both in structure and in function to the access point 104a. Therefore, only the access point 104a is described in detail. The access point 104a includes one or more processor(s) 130 (referred to simply as "processor 130"), a communication module 144 for effecting communication with the access terminal 118 and the RNC 108, location circuitry 148 for determining its location, and memory 132 for storing software 134. The processor 130 executes the software 134, which includes a neighbor group configuration routine 136, a paging group configuration routine 138, a location determination routine 146, and operating software 48. The operating software 140 includes an operating system 142, such as Linux® or vxWorks®.

The location determination routine 146 operates in connection with the location circuitry 148 to determine a physical location of the access point 104a. In some embodiments, the location circuitry 148 includes a global positioning system (GPS) that acquires the longitude and latitude of the access point 104a via GPS satellites. In other embodiments, the location circuitry 148 includes memory for storing location information entered by a technician who installs the access point 104a. For example, the technician may enter the location information using a keyboard or PDA that is communicatively coupled to the location circuitry 148 of the access point 104a. The location information may include the longitude and latitude of the access point 104a and/or a street address of the access point 104a. In these embodiments, the location determination routine 146 may include a secure mechanism for authenticating the location information entered by the technician. For example the location determination routine 146 may require the technician to enter a verified username and password before accepting location information from the technician. In some embodiments, the location determination routine 146 may affect a visual indicator (not shown) on the access point 104a to indicate whether the access point 104a is aware of its physical location.

The processor 130 operates in connection with the communication module 144 to transmit the location information of the access point 104a to the map server 120 and/or to the CGM server 122. The communication module 144 also receives data sent from the map server 120 and the CGM server 122. The communication module 144 facilitates communication by applying one or more communication routines (e.g., TCP/IP protocols) for transmitting and receiving data over the RAN 100 and external network 114 (e.g., the Internet).

The paging group configuration routine 138 determines the neighboring access points to include in a paging group and assigns the access point 104a to the paging group. In some embodiments, the paging group configuration routine 138 determines a paging group based on neighborhood information received from the map server 120. In other embodiments, the paging group configuration routine 138 receives a paging group assignment from CGM server 122. In these embodiments, the CGM server 122 uses the location information supplied by the access point 104a and neighborhood information supplied by the map server 120 to determine a paging group for the access point 104a.

Similarly, the neighbor group configuration routine 136 determines the neighboring access points to include in a neighbor group and assigns the access point 104a to the neighbor group. In some embodiments, the neighbor group configuration routine 138 determines a neighbor group based on neighborhood information received from the map server 120. In other embodiments, the neighbor group configuration routine 138 receives a neighbor group assignment from CGM server 122. In these embodiments, the CGM server 122 uses the location information supplied by the access point 104a and neighborhood information supplied by the map server 120 to determine a neighbor group for the access point 104a.

Figure 4:
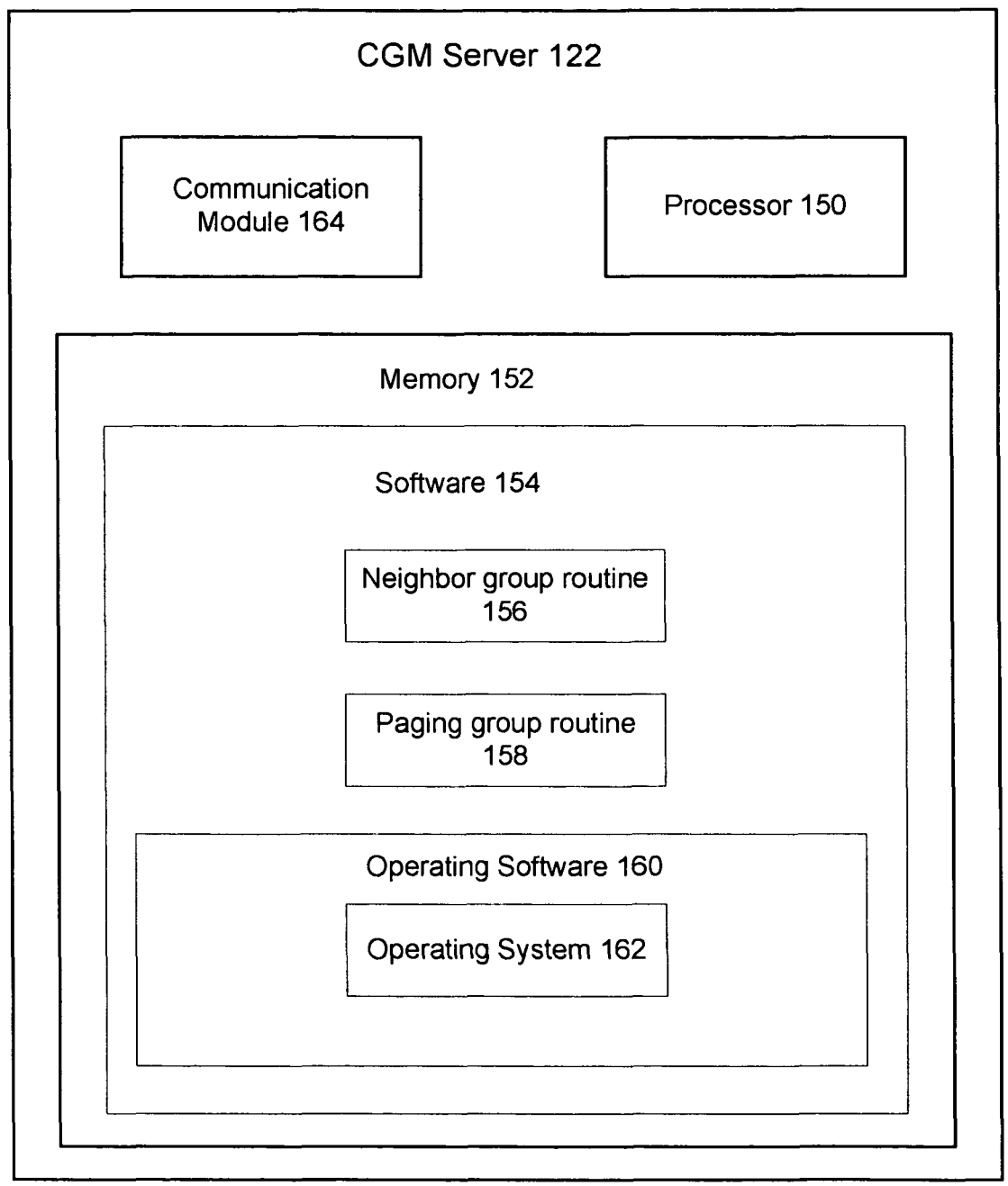
FIG. 4 is a block diagram of a server for use with the system of FIG. 1.

Referring to FIG. 4, the CGM Server 122 includes one or more processor(s) 130 (referred to simply as "processor 150"), a communication module 164 for effecting communication with the access points 104a-c via the RNC 108, and memory 152 for storing software 154. The processor 150 executes the software 154, which includes a neighbor group configuration routine 156, a paging group configuration routine 158, and operating software 160. The operating software 160 includes an operating system 162, such as Windows XP®.

The neighbor group and paging group configuration routines 156 and 158 use location data obtained from an access point (e.g., the access point 104a) and corresponding neighborhood information obtained from the map server 120 to calculate, respectively, neighbor groups and paging groups for the access point. The processor 150 operates in connection with the communication module 164 to transmit paging and neighbor group assignments to the access points 104a-c as well as receive information from the access points 104a-c and the CGM server 122. The communication module 144 facilitates communication by applying one or more communication routines (e.g., TCP/IP protocols) for transmitting and receiving data over the external network 114 (e.g., the Internet).

Figure 5:
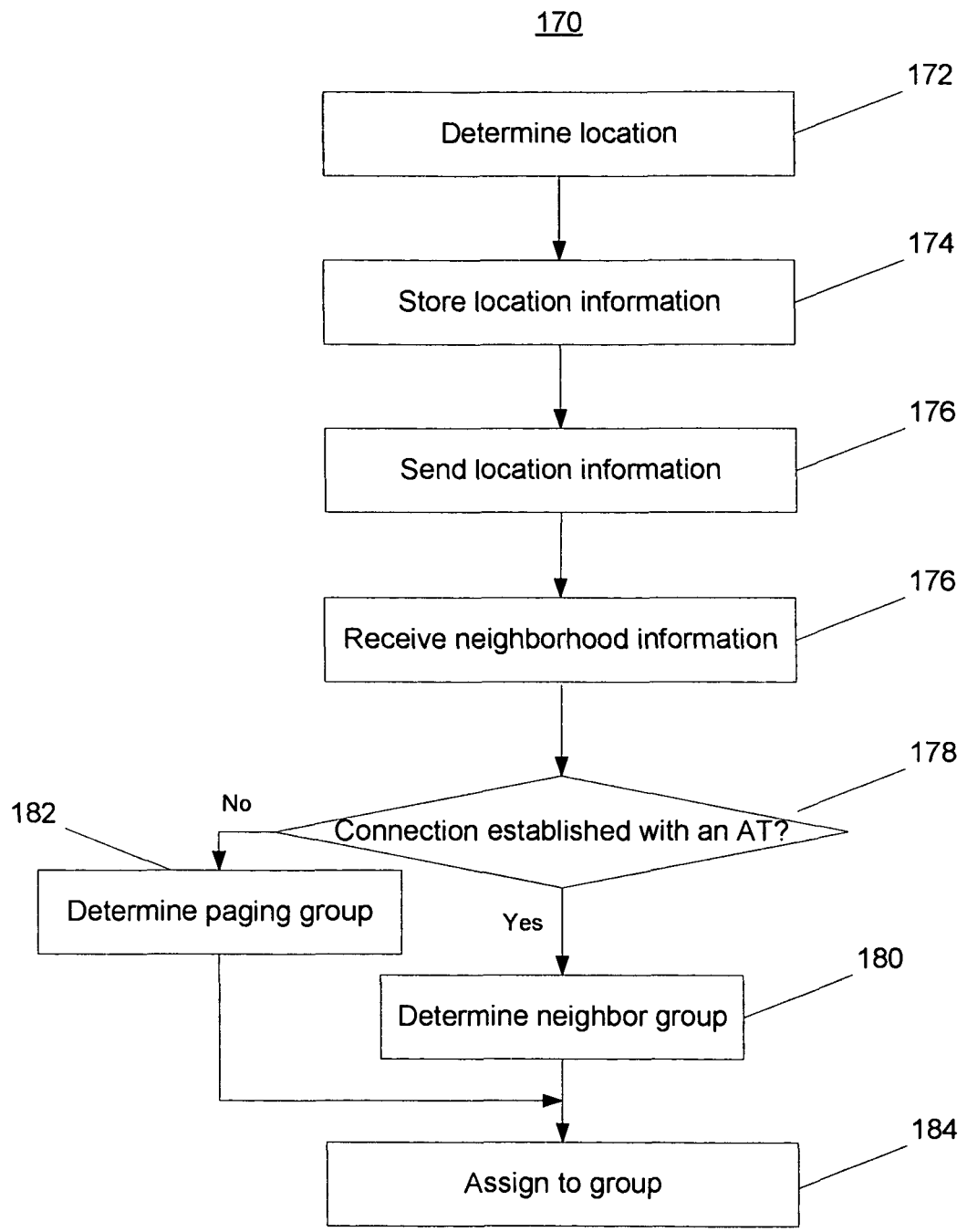
FIG. 5 is a flow diagram of a process performed by an access point.

Referring to FIG. 5, a communication group configuration process 170 is performed by access point 104a to determine a neighbor group and/or a paging group for the access point 104a. The configuration process 170 could also be performed by either of access points 104b-c. The process 170 determines (172) a geographic location of the access point 104a. As described above, the access point 104a may determine its location using a global positioning system (GPS) that acquires the longitude and latitude of the access point 104a via GPS satellites. The access point 104a may determine its location from location information entered by a technician who installs the access point 104a.

The location determined by the access point 104a is stored (174) as location information in memory and sent (176) to the map server 120. In some embodiments, a virtual location of the access point 104a, rather than a physical location, is determined, stored, and sent to the map server 122. The virtual location may include an IP address of the access point 104a or a set of coordinates in a virtual world (e.g., virtual worlds in online games). For example, the IP address of the access point 104a may be used with a map of the Internet to allow easy discovery of the access point 104a and neighboring access points in the IP space. This technique may be especially useful in situations where multicast is not available. In embodiments in which the access point 104a supplies the map server 120 with its virtual address, the map server 120 may convert the virtual address supplied by the access point 104a to a physical address of the access point 104a.

In response to receiving the location information, the map server 120 sends the access point 104a neighborhood information that includes neighboring access points located in the vicinity of the access point 104a and other information related to the physical area encompassing the access point 104a and the neighboring access points. For example, as described above, the neighborhood information may include one or more of the locations of the neighboring access points; the distances between the access point 104a and each of the neighboring access points; line of slight conditions (including topographical obstructions and impasses) between the access point 104a and the neighboring access points; connectivity (roads, foot paths etc.,) between an area covered by the access point 104a and each of the neighboring access points; radio interference conditions; and other information of interest. The neighborhood information is received (176) by the access point 104a. From the neighborhood information, the access point 104a determines communication groups (e.g., neighbor and paging groups) of neighboring access points that best meet various criteria and assigns itself to those communications groups. If the process 170 determines (178) that the access point 104a has already established communication with an access terminal, a neighbor group for facilitating a handoff is determined (180). However, if the process determines (178) that the access point 104a has not established communication with an access terminals, a paging group is determined. In some embodiments, the process 170 determines both a neighbor group and a paging group for the access point 104a regardless of whether the access point 104a is in communication with an access terminal.

When determining (180) a paging group, the process 170 analyzes the neighborhood information received from the map server 120 to determine those neighboring access points that are most likely to improve paging efficiency. For example, the process 170 may require the neighborhood information associated with a candidate neighboring access point to comply with one or more rules (e.g., the distance the access point 104a and the neighboring access point must be within a predetermined distance; the radio interference must be less than a predefined value; at least one road must connect the areas served by the access point 104a and the neighboring access point; no obstructions can be present in a line of sight between the access point 104a and the neighboring access point; etc.).

When determining (182) a neighbor group, the process 170 analyzes the neighborhood information received from the map server 120 to determine those neighboring access points that are most suitable for performing handoff functions with the access point 104a. In some embodiments, the process 170 may determine multiple communication groups based on various criteria. For example, a first paging group and/or neighbor group may include those neighboring access points whose signal conditions are the least noisy, and a second paging group and/or neighbor group may include those neighboring access points that are most accessible via transportation routes to the access point 104a. At least a portion of the neighboring access points belonging to the first and second communication groups may be the same or different. After a communication group has been determined (182 and/or 180), the process 170 assigns (184) the access point 104a to one or more communication groups.

As discussed above, the CGM server 122, rather than the individual access points 104a-c, may determine communication groups for the access points 104a-c.

Figure 6:
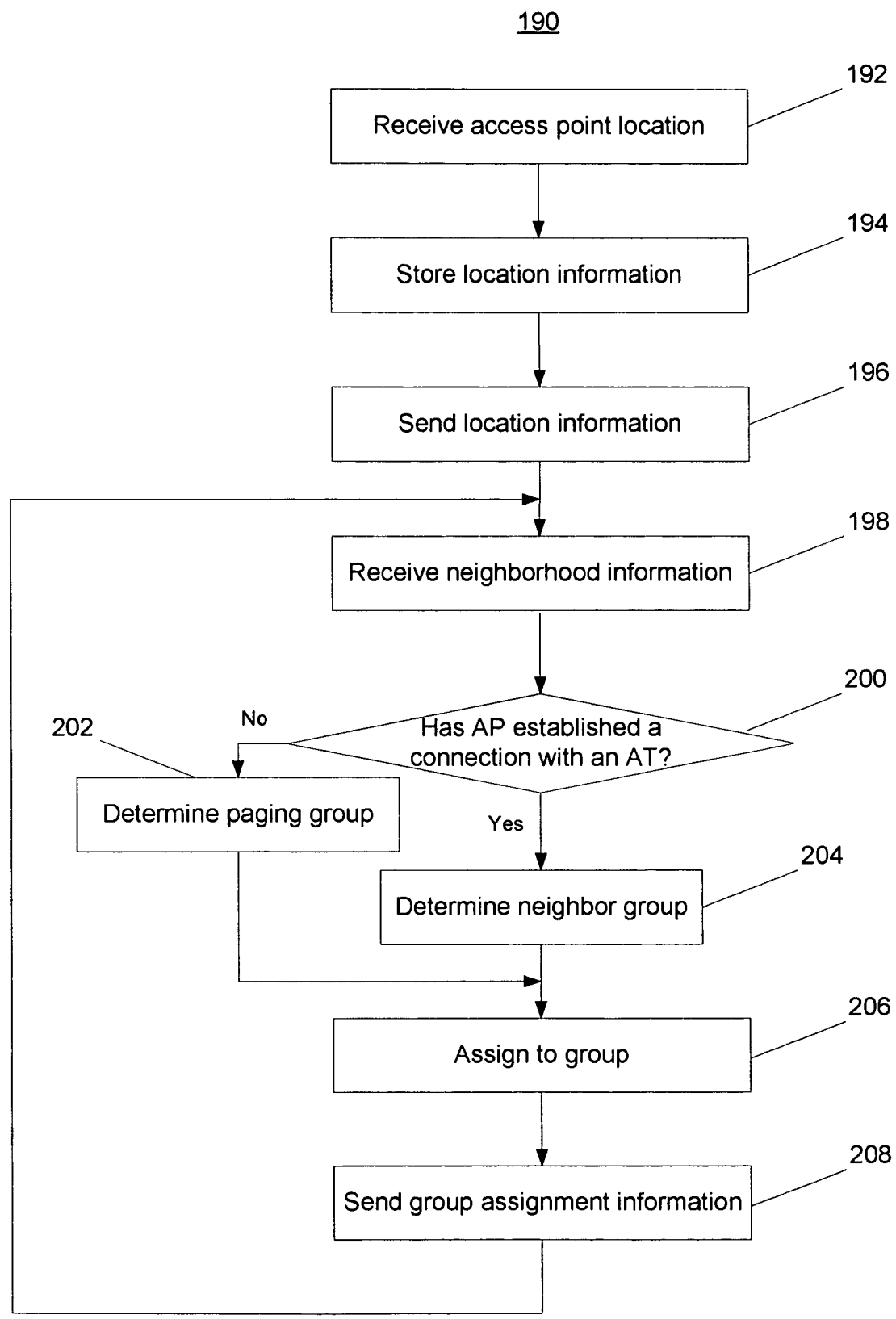
FIG. 6 is a flow diagram of a process performed by a server.

Referring to FIG. 6, the CGM server 122 performs a communication group configuration process 190 that determines communication groups for the access points 104a-c. For ease of explanation, the process 190 is described in relation to the access point 104a; however, the process 190 could be performed in relation to other access points (e.g., access points 104b-c). The CGM server 122 receives (172) location information from the access point 104a and stores (194) the location information in memory. The location information includes the geographic location of the access point 104a. The process 190 sends (196) the location information to the map server 120. In response to receiving the location information, the map server 120 sends the CGM server 122 neighborhood information that includes neighboring access points located in the vicinity of the access point 104a and other information related to the physical area encompassing the access point 104a and the neighboring access points. As described above, the neighborhood information may include one or more of the locations of the neighboring access points, the distances between the access point 104a and each of the neighboring access points, line of slight conditions (including topographical obstructions and impasses) between the access point 104a and the neighboring access points; connectivity (roads, foot paths, etc.) between an area covered by the access point 104a and each of the neighboring access points; radio interference conditions; and other information of interest.

The neighborhood information is received (198) by the CGM server 122. From the neighborhood information, the CGM server 122 determines for the access point 104a, communication groups (e.g., neighbor and paging groups) of neighboring access points that best meet various criteria. For example, if the process 190 determines (200) that the access point 104a has already established communication with an access terminal, the process 190 determines (204) a neighbor group for facilitating handoffs with the access point 104a.

However, if the process 190 determines (200) that the access point 104a has not established communication with an access terminal, the process 190 determines (202) a paging group for the access point 104a. In some embodiments, the process 190 determines both a neighbor group and a paging group for the access point 104a regardless of whether the access point 104a is in communication with an access terminal.

When determining (202) a paging group, the process 190 analyzes the neighborhood information received from the map server 120 to determine those neighboring access points that are most likely to improve paging efficiency. For example, the process 190 may require the neighborhood information associated with a candidate neighboring access point to comply with one or more rules (e.g., the distance the access point 104a and the neighboring access point must be within a predetermined distance, the radio interference must be less than a predefined value, at least one road must connect the areas served by the access point 104a and the neighboring access point, no obstructions can be present in a line of sight between the access point 104a and the neighboring access point, etc.).

When determining (204) a neighbor group, the process 190 analyzes the neighborhood information received from the map server 120 to determine those neighboring access points that are most suitable for performing handoff functions with the access point 104a. In some embodiments, the process 190 may determine multiple communication groups based on various criteria. For example, a first paging group and/or neighbor group may include those neighboring access points whose signal conditions are the most noise free, and a second paging group and/or neighbor group may include those neighboring access points that are most accessible via transportation routes to the access point 104a. At least a portion of the neighboring access points belonging to the first and second communication groups may be the same or different. After a communication group has been determined (202 and/or 204), the process 190 assigns (206) the access point 104a to one or more communication groups that have been determined. The CGM server 122 may store the communication group assignment(s) in memory. Communication group assignment information containing the communication groups to which the access point 104a has been assigned is then sent (208) to the access point 104a.

The CGM server 122 may send the communication group assignment information to the access point 104a immediately after a communication group has been assigned (206) or at a later time. In some embodiments, the CGM server 122 determines communication groups of the access points before the access points are deployed. In these and other embodiments, the CGM server 122 generates offline communication group configurations that can be applied to the access point 104a when it registers with the RAN 100. The CGM server 122 may generate and send new communication group assignments to the access point 104a in response to an event, which may include real-time changes to one or more parameters of a communication group assigned to the access point 104a. For example, changes in the geography, topology, channels conditions change (e.g., interference from a building), connectivity, and/or other changes affecting communication between the access point 104a and one or more neighboring access points of an assigned communication group may trigger the CGM server 122 to determine a more optimal communication group for the access point 104a. The offline mechanism by which the CGM server 122 distributes communication group assignments to access points 104a-c may be used to propagate the changes to assigned communication groups in a controlled fashion and to tweak communication groups that were automatically generated by the access points 104a-c.

In some embodiments, the CGM server 122 or the access point 104a may change other characteristics of communication using the neighborhood information generated from map server 122. For example, in addition to the communication configuration, the also transmission power of the access point 104a, modes for recovery from failure, and nodes allowing asynchronous discovery may be adjusted. For example, if there is a high power access point in the neighborhood of the access point 104a, the power of other new neighboring access points (as well as old neighboring access points) may be limited to reduce the interference. If there is a failure in one of the neighboring access points, the power of other neighboring access points may be increased.

In some embodiments, the CGM server 122 periodically calculates communication groups in a real-time fashion based on information supplied by the map server 120. The map server information may include real-time conditions of the geographical area associated with communication groups and alerts that there are changes to the geographical area (e.g., a new building has been erected, or a new road has been built, radio channel conditions, such as interference, shadow fading or multi-path fading). The CGM server 122 may update communication group assignments of access points periodically every few minutes, hours, days, weeks, months, years, etc.

In some embodiments, the access points 104a-c or the CGM server 122 can use portions of neighborhood information including the location information, topographical information, radio conditions and the user's mobility, or any combination thereof to predict the user's future location to determine the user's neighbor and paging groups. The prediction of user's future location may be based on or more of mobility models; statistical estimates, such as Bayesian estimation; and past recorded user behavior. A mobility model may be used to model a user's movement patterns. For example, a mobility model may be used to predict a user's movement along a road. Examples of mobility models include, but are not limited to: a Gauss-Markov Mobility model, a Random a Waypoint Mobility Model, a Manhattan Grid mobility model and a Random Walk model. Past recorded user behavior may include paths frequently traveled by a user during a given time or time period. For example, the recorded behavior information may include a route that a user frequently travels between his or her home and office during predictable times (e.g., 8:00-8:30 am and 5:00-5:30 pm on Monday through Friday). During these times, an access point or CGM server 122 may predict that the user is located somewhere on the route and determines communication groups for the user that are located in proximity to the route.

In some embodiments, the access points 104a-c or CGM server 122 automatically generates a global neighborhood map of all access points, including access points supporting different airlink technologies. The global neighborhood map may then be used for coordinating inter-technology handoffs between access points that support different airlink technologies. The global neighborhood map can also be used by the network to prevent RF dragging (e.g., to force connection closure if the access terminal is holding on to the connection despite having an opportunity to get better signal quality from another access point or RAN).

The CGM server 122 can be implemented in a centralized fashion, semi-distributed fashion (based on geographical areas), or fully distributed (peer to peer) fashion using techniques such as distributed hash tables. For example, in a centralized implementation, a single CGM server or group of CGM servers may communicate with the access points of a RAN. In a semi-distributed implementation, multiple CGM servers may each be assigned to a different geographical area and communicate with those access points located therein. In a distributed implementation, the access points determine their own communication groups and may receive updated communication group assignments periodically from a CGM server. The access points may also update their own communication groups independently of the CGM server.

The techniques described herein can be implemented in digital electronic circuitry, or in computer hardware, firmware, software, or in combinations of them. The techniques can be implemented as a computer program product, e.g., a computer program tangibly embodied in an information carrier, such as one or more machine-readable storage devices, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

The access point can also connect to weather reports, traffic reports etc. (either directly or via CGM) ie. weather reports could provide information where to expect more transmission issues, and traffic reports can provide information about areas where there are traffic jams and where there are more people talking on the phone or watching mobile TV. Based on information provided by such reports, the access point or CGM server can adjust the neighbor groups, paging groups or handoff groups (collectively communication groups). Not only geographic/topographical info, but other info related to that can be gathered from other servers.

The following are examples for illustration only and not to limit the alternatives in any way. The techniques described herein can be performed in a different order and still achieve desirable results. Other embodiments are within the scope of the following claims.

What is claimed is:

1. A method for grouping access points, the method comprising:
   accessing location information describing a location of a first access point included in a first group of access points;
   receiving neighborhood information comprising a topology of a first area, the first area comprising (i) the first access point, and (ii) a second access point that is a candidate for inclusion in the first group of access points;
   determining, based on the neighborhood information and the location information, that a topographical obstruction exists between the first access point an the second access point;
   excluding the second access point from the first group of access points;
   assigning, based on determining, the second access point to a second group of access points, wherein the first group of access points differs from the second group of access points;
   accessing a global neighborhood map of neighboring access points located in a second area comprising the first access point, wherein the first group of access points comprises the neighboring access points, wherein a neighboring access point is configured to establish a new connection with an access terminal if a connection between the access terminal and the first access point is breached; and wherein a third access point belongs to the neighboring access points; and coordinating a handoff between the first access point and the third access point using the global neighborhood map.

2. The method of claim 1, wherein receiving and assigning are performed by the first access point.

3. The method of claim 1, wherein receiving and assigning are performed by a server, and wherein the method further comprises:

sending assignment information from the server to the first access point, the assignment information being used by the first access point to determine that the first access point belongs to the first group of access points.

4. The method of claim 1, wherein the location information comprises longitude information and latitude information for the first access point.

5. The method of claim 1, wherein the location information comprises a virtual address determined for the first access point.

6. The method of claim 1, wherein the neighborhood information further comprises a distance between the first access point and the second access point.

7. The method of claim 1, wherein the neighborhood information further comprises information indicative of topographical line of sight conditions between the first access point and the second access point.

8. The method of claim 1, wherein the topographical obstruction comprises one or more of (i) a natural structure, and (ii) a manmade structure.

9. The method of claim 1, further comprising:
in response to receiving notification of a change in the neighborhood information, reconfiguring the first access point.

10. The method of claim 9, wherein reconfiguring comprises assigning the first access point to a different group.

11. The method of claim 9, further comprising detecting a change in geography of the first area comprising the first access point and the second access point.

12. The method of claim 9, further comprising detecting a change in channel conditions between the first access point and the second access point.

13. The method of claim 1, wherein the first group of access points comprises one or more third access points that are configured to receive a call transferred from the first access point during a handoff.

14. The method of claim 1, wherein the first group of access points comprises one or more third access points that are configured to establish a new connection with an access terminal when a connection between the access terminal and the first access point is breached.

15. The method of claim 1, wherein the neighborhood information is received from a map server application.

16. The method of claim 15, wherein:
the neighborhood information is received from the map server application in real-time as changes are detected by the map server application,
the changes are associated with one or more of (i) the location of the first access point, and (ii) a location of the second access point, and
the changes comprise one or more of: a topology, a geography, and a communication channel condition.

17. The method of claim 1, further comprising:
determining that third access point has increased signal quality relative to the first access point; and
directing, based on determining, an access terminal to close a connection with the first access point.

18. A system configured to group access points, the system comprising:
one or more processing devices; and
one or more machine-readable storage devices configured to store instructions that are executable by the one or more processing devices to perform operations comprising:
accessing location information describing a location of a first access point included in a first group of access points;
receiving neighborhood information comprising a topology of a first area, the first area comprising (i) the first access point, and (ii) a second access point that is a candidate for inclusion in the first group of access points;
determining, based on the neighborhood information and the location information, that a topographical obstruction exists between the first access point and the second access point;
excluding the second access point from the first group of access points;
assigning, based on determining, the second access point to a second group of access points, wherein the first group of access points differs from the second group of access points;
accessing a global neighborhood map of neighboring access points located in a second area comprising the first access point, wherein the first group of access points comprises the neighboring access points, wherein a neighboring access point is configured to establish a new connection with an access terminal if a connection between the access terminal and the first access point is breached; and wherein a third access point belongs to the neighboring access points; and
coordinating a handoff between the first access point and the third access point using the global neighborhood map.

19. The system of claim 18, wherein one of the one or more processing devices comprises a global-positioning satellite (GPS) device.

20. The system of claim 18, wherein one of the one or more processing devices comprises a location detection device configured to receive location information entered by a technician, the location information comprising one or more of: latitude information, longitude information, and street address information.

21. The system of claim 18, wherein the neighborhood information further comprises information indicative of topographical line of sight conditions between the first access point and the second access point.

22. The system of claim 18, wherein the operations further comprise:
sending assignment information to the first access point, the assignment information being used by the first access point to determine that the first access point belongs to.

23. The system of claim 18, wherein the first group of access points comprises one or more third access points that are configured to receive a call transferred from the first access point during a handoff.

24. The system of claim 18, wherein the first group of access points comprises one or more third access points that are configured to establish a new connection with an access terminal when a connection between the access terminal and the first access point is breached.

25. The system of claim 18, wherein the neighborhood information comprises a distance between the first access point and the second access point.

26. The system of claim 18, wherein the topographical obstruction comprises one or more of (i) a natural structure, and (ii) a manmade structure.

27. The system of claim 18, wherein the operations further comprise:
  assigning the first access point to a different group in response to receiving notification of a change in the neighborhood information.

28. The system of claim 27, wherein the change in the neighborhood information comprises a change in geography of the first area that comprises the first access point and the second access point.

29. The system of claim 27, wherein the change in the neighborhood information comprises a change in channel conditions between the first access point and the second access point.

30. The system of claim 18, further comprising a map server configured to generate the neighborhood information, wherein the neighborhood information is derived from a map of spatially referenced data corresponding to access points in a geographic area.

31. One or more machine-readable storage devices for grouping access points, the one or more machine-readable storage devices configured to store instructions that are executable by one or more processing devices to perform operations comprising:
  accessing location information describing a location of a first access point included in a first group of access points;
  receiving neighborhood information comprising a topology of a first area, the first area comprising (i) the first access point, and (ii) a second access point that is a candidate for inclusion in the first group of access points;
  determining, based on the neighborhood information and the location information, that a topographical obstruction exists between the first access point and the second access point;
  excluding the second access point from the first group of access points;
  assigning, based on determining, the second access point to a second group of access points, wherein the first group of access points differs from the second group of access points;
  accessing a global neighborhood map of neighboring access points located in a second area comprising the first access point, wherein the first group of access points comprises the neighboring access points, wherein a neighboring access point is configured to establish a new connection with an access terminal if a connection between the access terminal and the first access point is breached; and wherein a third access point belongs to the neighboring access points; and
  coordinating a handoff between the first access point and the third access point using the global neighborhood map.

32. The one or more machine-readable storage devices of claim 31, wherein the operations further comprise:
  sending assignment information to the first access point, the assignment information being used by the first access point to determine that the first access point belongs to.

33. The one or more machine-readable storage devices of claim 31, wherein the location information comprises longitude information and latitude information for the first access point.

34. The one or more machine-readable storage devices of claim 31, wherein the neighborhood information comprises a distance between the first access point and the second access point.

35. The one or more machine-readable storage devices of claim 31, wherein the topographical obstruction comprises one or more of (i) a natural structure, and (ii) a manmade structure.

36. The one or more machine-readable storage devices of claim 31, wherein the operations further comprise:
  assigning the first access point to a different group of access points in response to receiving notification of a change in the neighborhood information.

37. The one or more machine-readable storage devices of claim 31, wherein the first group of access points comprises one or more third access points that are configured to receive a call transferred from the first access point during a handoff.

38. The one or more machine-readable storage devices of claim 31, wherein the first group of access points comprises one or more third access points that are configured to establish a new connection with an access terminal when a connection between the access terminal and the first access point is breached.

39. The one or more machine-readable storage devices of claim 31, wherein the operations further comprise:
  continually checking for changes in the neighborhood information; and
  re-assigning the first access point to a different group in real-time based on changes detected in the neighborhood information.

40. The system of claim 18, wherein the operations further comprise:
  in response to receiving notification of a change in the neighborhood information, reconfiguring the first access point.

41. The system of claim 40, wherein reconfiguring comprises assigning the first access point to a different group.

42. The system of claim 40, wherein the operations further comprise:
  detecting a change in geography of the first area comprising the first access point and the second access point.

43. The system of claim 18, wherein:
  the neighborhood information is received from a map server application in real-time as changes are detected by the map server application,
  the changes are associated with one or more of (i) the location of the first access point, and (ii) a location of the second access point, and
  the changes comprise one or more of: a topology, a geography, and a communication channel condition.

44. The system of claim 18, wherein the operations further comprise:
  determining that third access point has increased signal quality relative to the first access point; and
  directing, based on determining, an access terminal to close a connection with the first access point.

45. The one or more machine-readable storage devices of claim 31, wherein the operations further comprise:
  in response to receiving notification of a change in the neighborhood information, reconfiguring the first access point.

46. The one or more machine-readable storage devices of claim 45, wherein reconfiguring comprises assigning the first access point to a different group.

47. The one or more machine-readable storage devices of claim 45, wherein the operations further comprise:
  detecting a change in geography of the first area comprising the first access point and the second access point.

48. The one or more machine-readable storage devices of claim 31, wherein:
  the neighborhood information is received from a map server application in real-time as changes are detected by the map server application,
  the changes are associated with one or more of (i) the location of the first access point, and (ii) a location of the second access point, and
  the changes comprise one or more of: a topology, a geography, and a communication channel condition.

49. The method of claim 1, wherein excluding the second access point from the first group of access points comprises:
  excluding, based on determining that the topographical obstruction exists between the first access point and the second access point, the second access point as the candidate for inclusion in the first group of access points.

* * * * *

UNITED STATES PATENT AND TRADEMARK OFFICE
CERTIFICATE OF CORRECTION

PATENT NO. : 8,457,084 B2
APPLICATION NO. : 11/642245
DATED : June 4, 2013
INVENTOR(S) : Ravi Valmikam et al.

Page 1 of 1

It is certified that error appears in the above-identified patent and that said Letters Patent is hereby corrected as shown below:

In the Claims:

Column 14, Line 53, In Claim 1, line 13, delete "an the second" and insert -- and the second --, therefor.

Signed and Sealed this
Third Day of September, 2013

Teresa Stanek Rea
*Acting Director of the United States Patent and Trademark Office*